Aug. 14, 1923. 1,465,156
J. W. BUCHER
FILTER
Filed Sept. 3, 1919 2 Sheets-Sheet 1
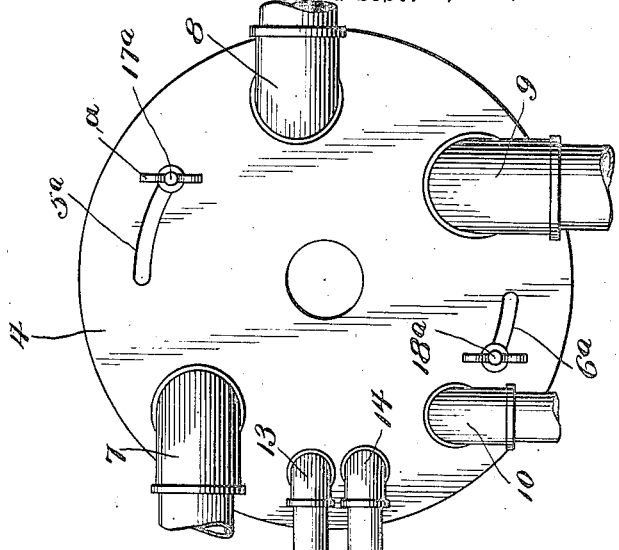
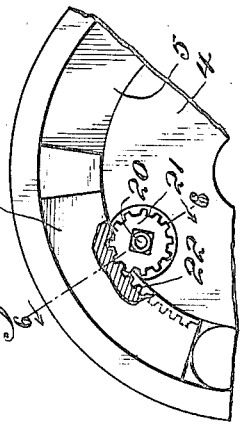
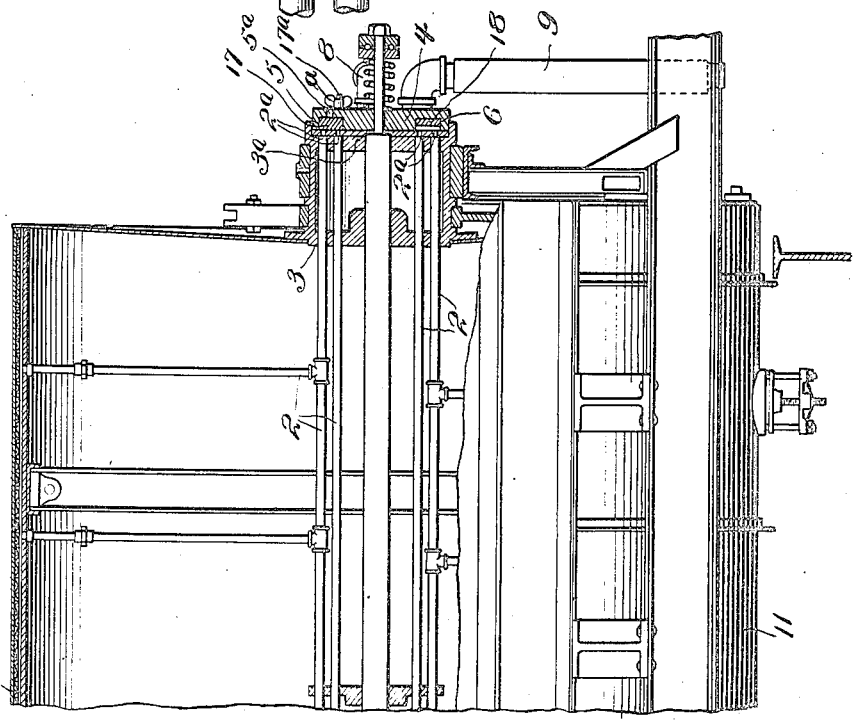
Inventor
John W. Bucher
By Spear Middleton
Donaldson & Hall
Attorney

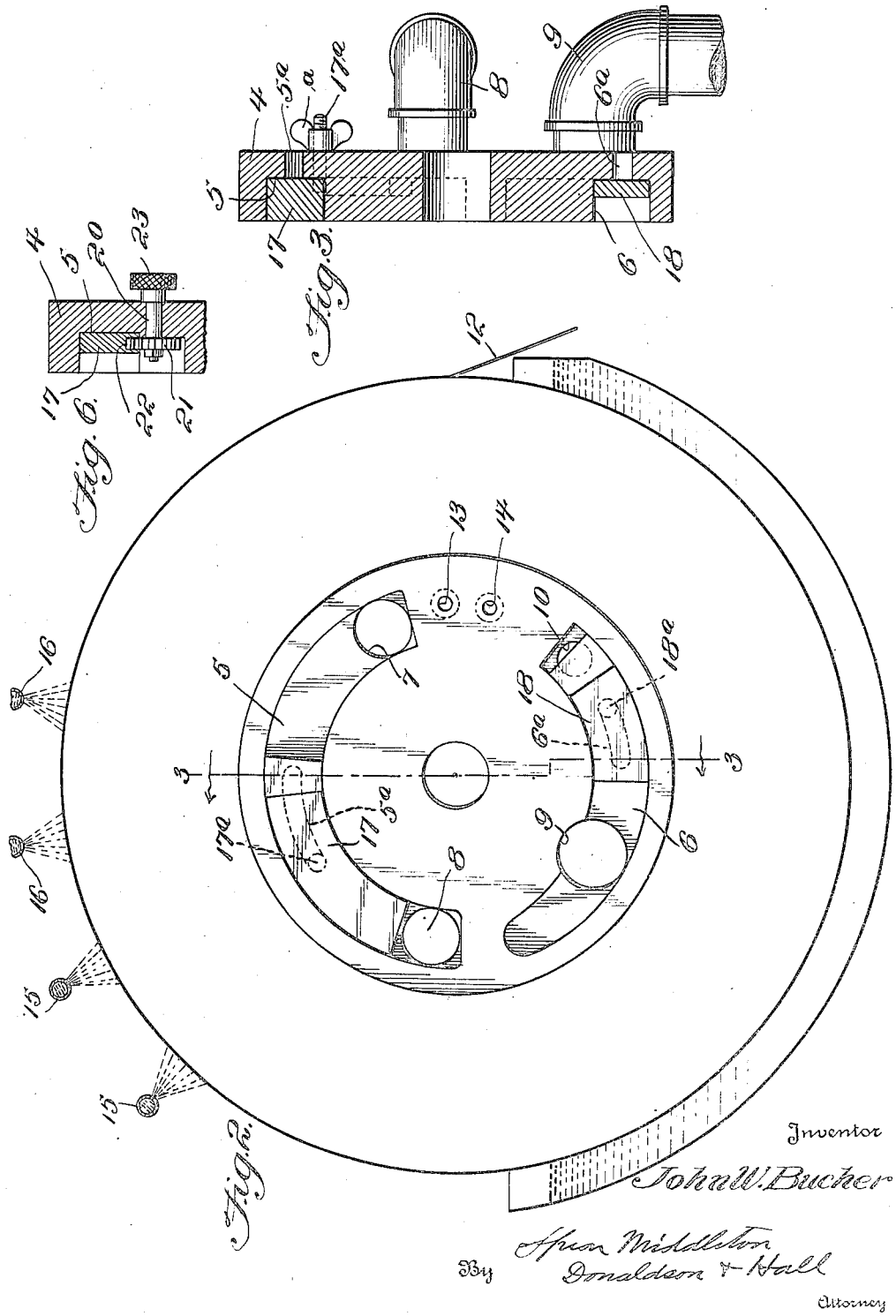

Patented Aug. 14, 1923.

1,465,156

UNITED STATES PATENT OFFICE.

JOHN WM. BUCHER, OF DENVER, COLORADO.

FILTER.

Application filed September 3, 1919. Serial No. 321,377.

*To all whom it may concern:*

Be it known that I, JOHN WM. BUCHER, a citizen of the United States, resident of Denver, Colorado, have invented certain new and useful Improvements in Filters, of which the following is a specification.

My present invention relates to improvements in continuous rotary filters of the type employing a drum partly submerged in the material to be filtered such as shown for example in the reissued Letters Patent to Randal P. Akins, No. 14,214, dated Nov. 14th, 1916.

In such filters, as used in the filtration of fluids such as cyanide solutions containing valuable metals in solution, the liquid drawn through the filter surface while submerged, is the richest and is preferably collected separately for further treatment, as for example by precipitation.

A cake is formed upon the submerged filter surface and as this emerges from the tank it is customary to subject it to a first wash of preferably a weak solution which may be added to the first solution or treated separately as desired.

Thereafter the cake is subjected to a second wash, usually of barren liquid which after passing through the filter cake contains but little value and is generally used for a previous operation such as the first wash. Finally the filter surface is cleared of the cake by suitable means such as a scraper or blowing or both and the cleared filter surface again enters the material in the tank.

I have found that in operating under different conditions the line of separation between the different zones of action should be varied. I have also found that when the cleared filter surface first enters the bath the solution drawn through may be cloudy due to the presence of fine solids which pass through the cleared filter medium, but are retained in the cake as soon as the latter thinly covers the filter surface; and the presence of such cloudiness is objectionable though the solution is too valuable to waste.

The present invention aims to provide means by which the filter may be readily adjusted to vary the zones of action and accurately divide the wash liquids at the exact point necessary to secure the best results, and to enable this to be accomplished while the filter is in operation so that results may be accurately tested or gaged during operation, and any necessary adjustments made without stopping the filter.

The invention further aims to provide means by which the first solution drawn through the filter surface may be kept separate from the later tank solution and the line of division likewise adjusted.

With these and other objects in view the invention includes the novel features of construction and arrangement and combination of parts hereinafter described and defined by the appended claims.

An embodiment of my invention is illustrated in the accompanying drawing in which—

Figure 1 is a central vertical longitudinal section through the filter and valve, Figure 2 is an end view of the valve plate of a rotary filter, the filter drum and solution tank being shown conventionally as these form, per se, no part of my invention, and the valve plate, for clearness of disclosure, being shown greatly enlarged in proportion to the drum, Figure 3 is an enlarged sectional detail of the stationary valve plate, and Figure 4 is an outside face view, Figure 5 is a detail view of a modification, and Figure 6 is a sectional detail on line 6—6 of Fig. 5.

Referring by reference characters to this drawing the numeral 1 designates the rotary filter drum divided up into a plurality of sections as disclosed in said Letters Patent to Akins aforesaid, these sections being respectively connected by pipes 2 with the hub member 3 which has an end face or portion 3ª designed to form the rotary member of the valve and to co-operate with the stationary valve member 4, the pipes 2 connecting with the annularly arranged ports 2ª in the hub member 3.

The stationary valve member is of circular or disc shape designed to fit within a correspondingly shaped recess or counterbore in the end of the hub 3, and it is provided on its inner face with upper and lower arc shaped recesses or chambers 5 and 6 which are concentric with the axis of the filter drum. A suction pipe 7 connects with one end of the recess or chamber 5 and a similar suction pipe 8 connects with the other end of said recess.

In a similar manner a suction pipe 9 connects with the recess or chamber 6 at a suitable distance from the left hand end thereof (Figure 2) and a suction pipe 10 connects with the opposite or right hand end. The solution tank into which the drum dips is indicated at 11 and at 12 is shown, diagrammatically, a scraper which removes the filter cake just prior to the drum surface entering the tank, 13 and 14 designating blowing pipes entering the valve plate between the ends of recesses 5 and 6 to further assist in removing the cake and clearing the filter surface in the manner well understood by those skilled in this art.

The weak wash solution and clear wash solutions are supplied as by spray pipes indicated at 15, 15 and 16, 16 respectively, four being indicated as a convenient arrangement, though the number thereof is not material.

Located within the arc shaped recesses or chambers are a pair of movable or slidable gates, one in each, designated 17 and 18 respectively which are of arc shape and snugly and accurately fit the cross section of the chambers, but are of considerably less length.

These gates have operating members or extensions 17$^a$ and 18$^a$ extending through arc shaped slots 5$^a$ and 6$^a$ in the valve plate by which the gates may be slid or adjusted toward or from either end.

The operating members are preferably threaded to receive wing nuts "$a$" by which the gates may be clamped in their adjusted positions.

It will be observed that the gates exceed the slots 5$^a$ and 6$^a$ in length so as to at all times cover them and prevent leakage.

By adjusting the lower gate 18 towards either the right or left (Figure 2), the point of separation between the suction action of pipes 10 and 9 may be accurately determined, and in the same manner the upper gate 17 may be moved towards the left or right to vary the point of separation of the suction action of pipes 8 and 7 respectively. As will be seen, this adjustment may be effected while the filter is in operation by merely loosening the wing nuts, sliding the gates in the proper direction, and again tightening the nuts to clamp the gates in their adjusted positions.

Instead of operating the gate in the manner above described I may provide a rotatable shaft or spindle 20 journaled in a suitable opening in the wall of the valve member and carrying a gear 21 on its inner end meshing with a rack 22 on the gate 17$^x$, a suitable handle 23 being provided for rotating the spindle.

While in the foregoing description I have referred more especially to the filter in connection with the filtration of cyanide or value bearing solutions I do not limit myself in this respect.

Having thus described my invention, what I claim is:

1. In a rotary filter of the class described, a revolving ported member, a stationary valve member co-operating therewith and having an arc shaped recess to align with the ports of said revolving member, pipes connected to opposite ends of said recess, a slidable gate in said recess intermediate the ends thereof, and means for adjusting said gate from the exterior of the valve without interrupting the motion of the filter.

2. In a rotary filter of the class described, a revolving ported member, a stationary valve member co-operating therewith and having an arc shaped recess to align with the ports of said revolving member, pipes connected to opposite ends of said recess, and a gate in said recess adjustable towards either end thereof, and an operating device connected with said gate and extending through an opening in the said stationary member.

3. In a rotary filter of the class described, a revolving ported member, a stationary valve member co-operating therewith and having an arc shaped recess to align with the ports of said revolving member, pipes connected to opposite ends of said recess, and a gate in said recess adjustable towards either end thereof, said stationary member having an arc shaped slot of less length than said gate, and said gate having an operating member extending through said slot.

4. In a rotary filter of the class described, a revolving ported member, a stationary valve member co-operating therewith and having an arc shaped recess to align with the ports of said revolving member, pipes connected to opposite ends of said recess, and a gate in said recess adjustable towards either end thereof, said stationary member having an arc shaped slot of less length than said gate, and said gate having an operating member extending through said slot, and means for locking said gate against movement.

In testimony whereof, I affix my signature.

JOHN WM. BUCHER.